United States Patent
Miura et al.

(10) Patent No.: US 6,754,315 B1
(45) Date of Patent: Jun. 22, 2004

(54) INTERNET TELEPHONE SYSTEM AND TERMINAL DEVICE

(75) Inventors: Takeshi Miura, Tokyo (JP); Nobuo Uee, Tokyo (JP); Mitsuru Nishitsuka, Tokyo (JP)

(73) Assignee: Pioneer Corporation, Tokyo (JP)

( * ) Notice: Subject to any disclaimer, the term of this patent is extended or adjusted under 35 U.S.C. 154(b) by 776 days.

(21) Appl. No.: 09/598,315

(22) Filed: Jun. 21, 2000

(30) Foreign Application Priority Data

Jun. 29, 1999 (JP) .......................................... 11-182945

(51) Int. Cl.[7] ............................................. H04M 11/00
(52) U.S. Cl. ................. 379/93.07; 379/90.01
(58) Field of Search .......................... 379/93.07, 93.06, 379/93.05, 90.01, 93.14, 110.01; 725/109, 110, 111

(56) References Cited

U.S. PATENT DOCUMENTS

| | | | | |
|---|---|---|---|---|
| 5,034,948 A | * | 7/1991 | Mizutani et al. ....... | 379/110.01 |
| 5,635,980 A | * | 6/1997 | Lin et al. ................ | 379/90.01 |
| 5,671,267 A | * | 9/1997 | August et al. ......... | 379/110.01 |
| 5,999,612 A | * | 12/1999 | Dunn et al. ............... | 379/90.01 |
| 6,029,047 A | * | 2/2000 | Ishida et al. ............. | 379/93.09 |
| 6,393,104 B1 | * | 5/2002 | Akhteruzzaman et al. ....................... | 379/93.07 |

* cited by examiner

Primary Examiner—Stella Woo
(74) Attorney, Agent, or Firm—Sughrue Mion, PLLC

(57) ABSTRACT

A CATV station 1 for broadcasting a television program is connected to an internet network B. The CATV station 1 is connected to a terminal device 2. The terminal device includes a tuner section T for receiving a broadcasting signal for the television program transmitted from the CATV station, an interface section S for making transmission/reception of a telephone signal for the internet network B and a switching circuit 5 which is connected to the interface section, a telephone set 3 and a public switched phone network C. The switching circuit 5 selectively connects the telephone set 3 to the interface section S or the public switched phone network. In this configuration, the internet telephone can be used without doing troublesome operations, and the public switched phone network or internet network can be selected according to the facility of the internet terminal device on the side of a called party so that telephone call can be executed easily.

12 Claims, 2 Drawing Sheets

US 6,754,315 B1

INTERNET TELEPHONE SYSTEM AND TERMINAL DEVICE

BACKGROUND OF THE INVENTION

1. Field of the Invention

The present invention relates to a system for using an internet telephone and a terminal device employed therefor.

2. Description of the Prior Art

In recent years, an internet telephone for having a call through an internet network has become prevalent.

The internet telephone refers to having audio call in real time using dedicated software between internet terminals such as personal computers to each of which a microphone and a speaker are connected.

Such an internet telephone has an advantage that it can use a long-distance call or international telephone call at a low price at the expense of only connecting contract fee with an internet connecting dealer called "internet service provider" and telephone fee from the public switched phone network to a neighboring access point.

However, where such an internet telephone is employed in general homes or SOHO (small office home office), as shown in FIG. 3, it is necessary to connect an internet terminal point (unit) IP such as a personal computer, which is separate from a telephone set TEL for the public switched phone network, to an NTT line TS which is the public switched phone network and hence to prepare two kinds of telephone set s.

FIG. 3 shows a case where a telephone set TEL for a public switched phone network and an internet terminal point IP are connected to an NTT line TS through a terminal adapter TA of ISDN.

The internet telephone cannot be employed if a called party is not provided with hardware and software necessary for the internet telephone. Further, even if the called party is provided with such tooling, if the internet terminal point on the side of the called party has not been booted, the internet telephone cannot be employed.

Therefore, in the above cases, when a calling party intends to make a call again over the public switched phone network, he must take up the telephone set TEL to make a call.

When the calling party wants to use the internet telephone, if the internet terminal such as a personal computer is not always on, he must boot the internet terminal point every time. Therefore, a general home or SOHO where the internet terminal point has not been always booted cannot make the internet telephone immediately so that the complicate operation for making the internet telephone is required. This makes it difficult to use the internet telephone.

SUMMARY OF THE INVENTION

The present invention has been accomplished to solve the problems encountered in the use of the internet telephone as described above.

A primary object of the present invention is to provide an internet telephone system which can use the internet telephone without making the above troublesome operation, and can easily make a call by selecting a public switched phone network or an internet network according to the installing state of an internet terminal point and the booting state thereof.

A secondary object of the invention is to provide an internet telephone terminal device which constitutes such a internet telephone system.

In order to attain the first object of the invention, in accordance with the first aspect of the invention, there is provided an internet telephone system comprising:

an internet network;
a CATV station connected to the internet network so as to broadcast a television program;
a public switched phone network; and
a terminal device connected to the CATV station and the public switched phone network and including a tuner section for receiving a broadcasting signal for the television program transmitted from the CATV station, an interface section for making transmission/reception of a telephone signal for the internet network and a switching circuit which is connected to the interface section, a telephone set and the public switched phone network, wherein the switching circuit selectively connects the telephone set to the interface section or the public switched phone network.

In the above internet telephone system, the CATV station is connected to the internet network, and the terminal device is connected to the CATV station through a transmission cable.

The terminal device receives the broadcasting signal (RF signal) transmitted from the CATV station through the transmission cable by the tuner section, subjects the broadcasting signal to prescribed video signal processing and audio signal processing and supplies the resultant signal to a television receiver connected to the terminal device.

In the terminal device, the switching means incorporated therein is connected to the telephone set and the public switched phone network such as NTT.

Where the call by the internet telephone through the internet network is to be executed, the telephone set is connected to the interface section by the switching means, whereby the transmission/reception of the telephone signal is executed between the telephone set and internet network through the interface section.

Where the call by the public telephone through the public switched phone network is to be executed, the telephone set is connected to the public switched phone network by the switching means, whereby the transmission/reception of the telephone signal is executed between the telephone set and public switched phone network.

In accordance with the internet telephone system as described above, when the user wants to use the internet telephone, by using the terminal device for the CATV the power of which is usually always "on", he is not required to wait until the terminal device is booted.

A user can selectively use the internet telephone or the public telephone by a single telephone set. Unlike before, therefore, it is not required to provide the internet terminal in addition to the public telephone set.

Further, in accordance with the status of the telephone facilities on the side of the called party, the calling party can use easily properly the public telephone or internet telephone which is cheap in the calling fee. Further, when the calling party calls through the internet telephone, even the called party has not yet booted the internet terminal device, the calling party immediately calls again through the public switched phone network using the same telephone set.

In order to attain the first object, preferably, the terminal device comprises audio control means for controlling an amplification factor of an audio signal of the television program supplied from the tuner section when a telephone signal is supplied from the telephone set, interface section or public switched phone network to the switching means.

In such a configuration, where the call by the internet telephone or public telephone is executed, when the switching means of the terminal device is supplied with a telephone signal from the telephone set, from the internet network through the interface section or from the public switched phone network, the audio control means limits an amplification factor of an audio signal of the television program in the tuner section to a prescribed value.

In accordance with this configuration, during the call by the internet telephone or public telephone, since the sound volume issued from the television receiver is automatically reduced, the call by the telephone set cannot be impeded by the sound issued from the television receiver.

In order to attain the first object, the switching means selectively connects the telephone set to the interface section or the public switched phone network on the basis of a switching signal supplied from the telephone set.

Namely, the switching between the call by the internet telephone in the terminal device and that by the public telephone is made by a switching signal issued from the telephone set when the calling operation by the telephone set is done.

For this reason, the call by the internet telephone or by the public switched phone network can be easily selected on the side of the telephone set.

In order to attain the above object, preferably, the switching signal is outputted in accordance with a discrimination signal appended to a telephone number.

Specifically, the call by the internet telephone or by the public switched phone network is selected by inputting the discrimination code (e.g. number such as 1 and 2) corresponding to the internet telephone or public telephone when the telephone number of the called party is input to the telephone set.

For this reason, the call by the internet telephone or by the public telephone can be easily selected by simple operation of inputting the discrimination code on the side of the telephone set.

In order to attain the second object of the invention, there is provided a terminal device for an internet telephone system comprising:

a tuner section for receiving a broadcasting signal for the television program transmitted from the CATV station, the tuner section being connected to the CATV station;

as an interface section for making transmission/reception of a telephone signal for the internet network; and a switching circuit connected to the interface section, a telephone set and a switched phone network, the switching circuit for selectively connecting the telephone set to the interface section or the public switched phone network.

The terminal device is connected to the CATV station, which is connected to the internet network, through a transmission cable. The incorporated switching means is connected to the telephone set and the public switched phone network such as NTT.

The terminal device receives the broadcasting signal (RF signal) transmitted from the CATV station through the transmission cable by the tuner section, subjects the broadcasting signal to prescribed video signal processing and audio signal processing and supplies the resultant signal to a television receiver connected to the terminal device.

Where the call by the internet telephone through the internet network is to be executed, the telephone set is connected to the interface section by the switching means, whereby the transmission/reception of the telephone signal is executed between the telephone set and internet network through the interface section.

Where the call by the public telephone through the public switched phone network is to be executed, the telephone set is connected to the public switched phone network by the switching means, whereby the transmission/reception of the telephone signal is executed between the telephone set and public switched phone network.

In accordance with the terminal device, when the user wants to use the internet telephone, by using the terminal device for the CATV the power of which is usually always "on", he is not required to wait until the terminal device is booted.

A user can selectively use the internet telephone or the public telephone by a single telephone set. Unlike before, therefore, it is not required to provide the internet terminal in addition to the public telephone.

Further, in accordance with the status of the telephone facilities on the side of the called party, he can use easily properly the public telephone or internet telephone which is cheap in the calling fee. Further, when the calling party calls through the internet telephone, even when the called party has not yet booted the internet terminal device, the calling party immediately calls again through the public switched phone network using the same telephone set.

In order to attain the second object, preferably, the terminal device further comprises audio control means for controlling an amplification factor of an audio signal of the television program supplied from the tuner section when a telephone signal is supplied from the telephone set, interface section or public switched phone network to the switching means.

In such a configuration, where the call by the internet telephone or public telephone is executed, when the switching means of the terminal device is supplied with a telephone signal from the telephone set from the internet network through the interface section or from the public switched phone network, the audio control means limits an amplification factor of an audio signal of the television program in the tuner section to a prescribed value.

In accordance with this configuration, during the call by the internet telephone or public telephone, since the sound volume issued from the television receiver is automatically reduced, the call by the telephone set cannot be impeded by the sound issued from the television receiver.

In order to attain the second object, the switching means selectively connects the telephone set to the interface section or the public switched phone network on the basis of a switching signal supplied from the telephone set.

Namely, the switching between the call by the internet telephone in the terminal device and that by the public telephone is made by a switching signal issued from the telephone set when the calling operation by the telephone set is done.

For this reason, the call by the internet telephone or by the public switched phone network can be easily selected on the side of the telephone set.

In order to attain the second object, preferably, the switching signal is outputted in accordance with a discrimination signal appended to a telephone number.

Specifically, the call by the internet telephone or by the public switched phone network is selected by inputting the discrimination code (e.g. number such as 1 and 2) corresponding to the internet telephone or public telephone when the telephone number of the called party is input to the telephone set.

For this reason, the call by the internet telephone or by the public telephone can be easily selected by simple operation of inputting the discrimination code on the side of the telephone set.

The above and other objects and features of the invention will be more apparent from the following description taken in conjunction with the accompanying drawings.

DESCRIPTION OF THE PREFERRED EMBODIMENTS

Figure 1:
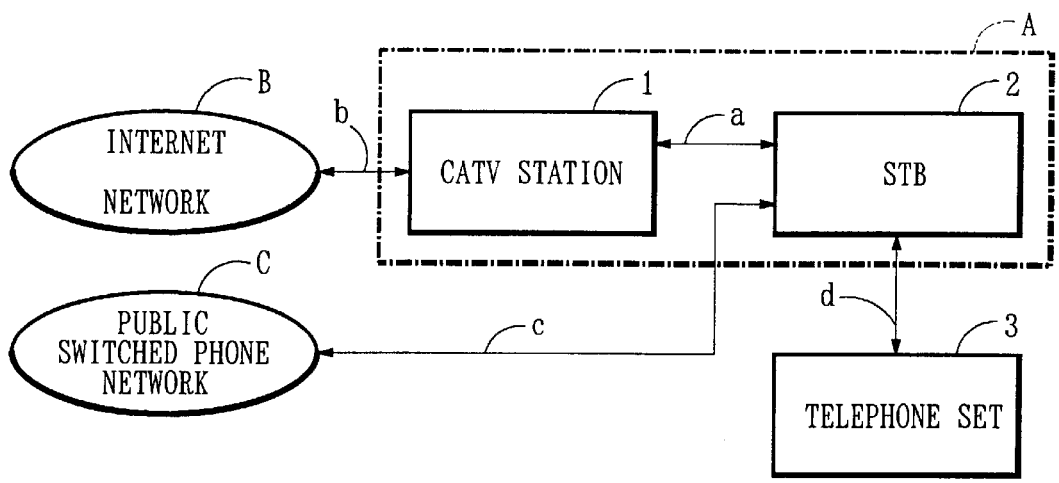
FIG. 1 is a block diagram showing an embodiment of the internet telephone system according to the present invention.
Figure 3:
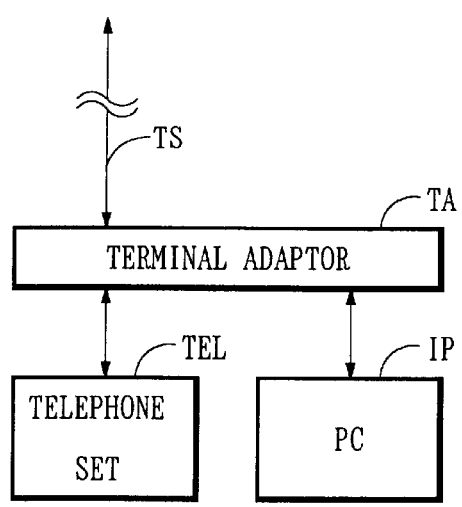
FIG. 3 is a conceptual view of the internet telephone system according to a prior art.

Now referring to the drawings, an explanation will be given of embodiments of the invention.

FIG. 1 is a block diagram showing an embodiment of the internet telephone system according to the present invention. The internet telephone system shown in FIG. 1 enables the call through an internet telephone using a cable network for broadcasting broadcast programs.

As seen from FIG. 1, a CATV system is constituted in which a terminal device 2 installed in a general home or SOHO located in a broadcasting area is communicated with a CATV station 1, which broadcasts various broadcast programs, through a broadcasting cable a of a coaxial cable or optical fiber.

The CATV station 1 in the CATV system is always communicated with an internet network B through the coaxial cable or optical fiber b.

The terminal device 2 constitutes a "set top box (STB)" including an interface portion for making a call by an internet telephone as described later as well as a tuner function for receiving programs broadcasted from the CATV station 1.

The terminal device 2 is communicated with a public switched phone network C such as NTT through a modular line c. A telephone set 3 is connected to the terminal device 2 through a modular line d.

Figure 2:
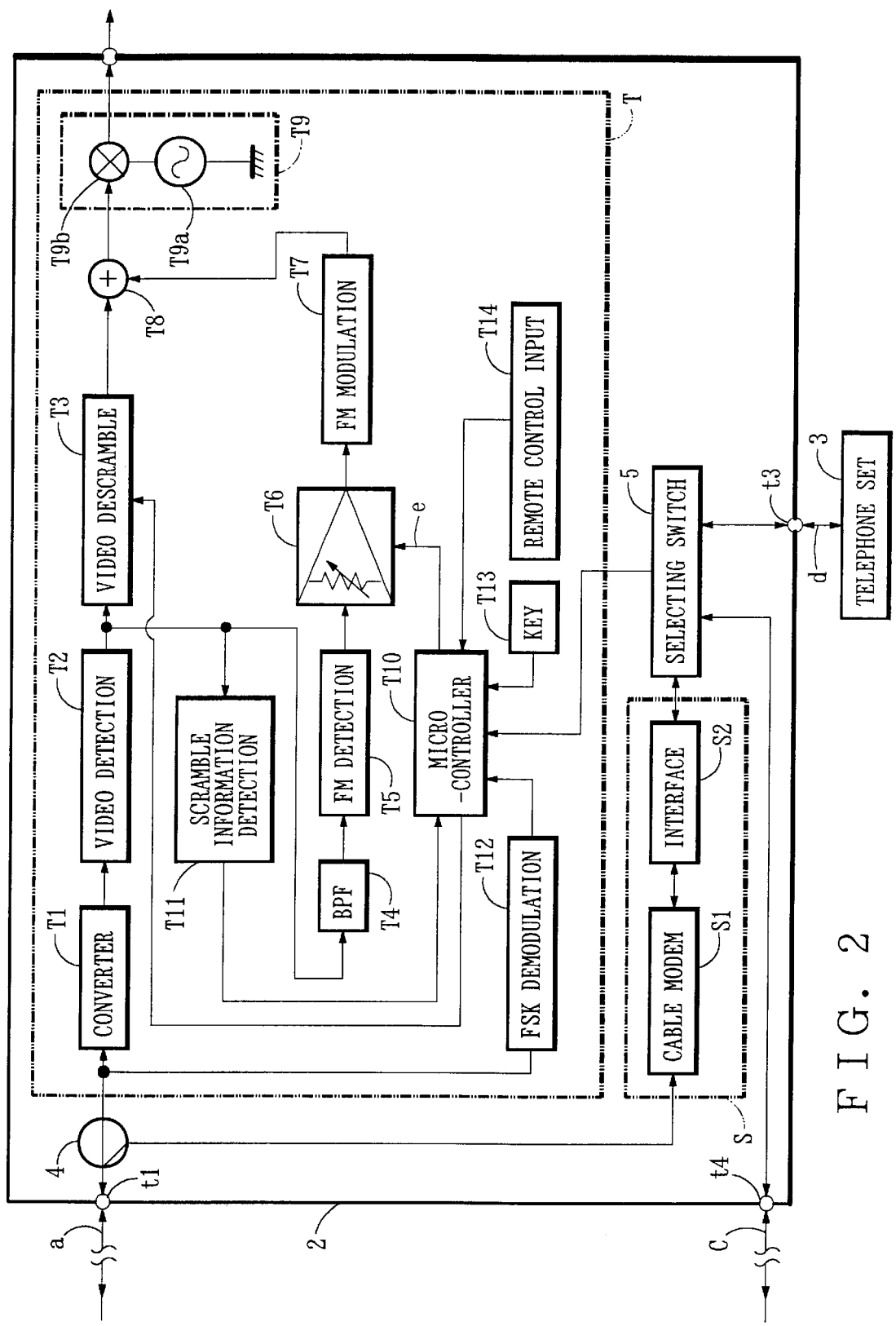
FIG. 2 is a block diagram showing an embodiment of the terminal device of an internet telephone system according to the invention.

FIG. 2 is a block diagram of the internal configuration of the terminal device 2 constituting a set top box.

As seen from FIG. 2, the terminal device 2 includes a tuner portion T for receiving a TV signal of the program broadcasted from the CATV station 1 and an interface portion S for connecting the telephone set 3 to the CATV station 1.

The tuner section T of the terminal device 2 includes a converter T1 for frequency-converting a radio-frequency band (RF) signal which is received through a distributor 4 from a connecting terminal t1 to which the broadcasting cable a is connected, a video detecting circuit T2 for detecting the converted signal, a video de-scramble circuit T3 for releasing the scramble of the detected video signal, a band-pass filter (BPF) T4 for extracting an audio carrier wave from the video signal supplied from the video detecting circuit T2, an FM detecting circuit T5 for FM-detecting the extracted audio carrier wave, an audio amplifying circuit T6 for amplifying the FM-detected audio signal, and a FM modulating circuit T7 for FM-modulating the amplified audio signal.

The tuner section T further includes a synthesizer T8 for synthesizing the video signal with the scramble released by the video de-scramble circuit T3 and the audio signal FM-modulated by the FM modulating circuit T7, and a modulator T9 consisting of a local oscillator T9a and a mixer T9b, for AM-modulating the synthesized signal from the synthesizer T8 into a TV channel signal at a prescribed frequency. In this case, the TV channel signal modulated by the modulator T9 will be sent from an output terminal to a TV receiver (not shown) connected thereto.

The tuner section T includes a microcomputer T10. The microcomputer T10 is connected to a scramble information detecting circuit T11 for detecting the scramble information from the video signal supplied from the video detecting circuit T2 and an FSK demodulating circuit T12 for demodulating the scramble information from the FSK signal transmitted in outbound from the CATV station 1, a key input circuit T13 and a remote controller input circuit 14.

The micro-controller T10 is connected to the video de-scramble circuit T3, and serves to control releasing of the scramble in the video de-scramble circuit T3 on the basis of the scramble information supplied form the scramble information detecting circuit T11 and FSK demodulating circuit T12.

The micro-controller T10 is connected to the audio amplifying circuit T6. When a telephone signal is supplied from the interface portion S as described later, the micro-controller T10 sends, to the audio amplifying circuit T6, an amplification limiting signal e for previously setting the amplification factor of the audio signal in the audio amplifying circuit T6.

The interface portion S includes a cable modem S1 connected to the connecting terminal t1 through the distributor 4 and an interface S2 connected to the cable modem S1.

The cable modem S1 enables the bidirectional call via a CATV network in such a manner that a modem signal converted from the telephone signal from a telephone set is inserted in a vacant band of a CATV region.

The interface S2 serves to convert the audio signal from the telephone set into the mode signal which can be modulated by the cable modem S1 and to convert the modem signal modulated by the cable modem S1 into an audio signal for the telephone set.

The interface unit S2 of the interface unit S is connected to a switch circuit 5.

The switching circuit 5 is connected to the telephone set 3 through a modular terminal t3. The switching circuit 5 is connected to the public switched phone network such as NTT through a public switched phone terminal t4.

In accordance with a discriminating signal (described later) supplied from the telephone set 3 connected to the modular terminal t3, the switching circuit 5 switches the modular terminal t3 between the interface S2 and the public switched phone terminal t4 and selectively connects the telephone set 3 to the internet network B via the CATV network or the public switched phone network C (FIG. 1).

In this example, the switching circuit 5 is adapted as follows. When the number data signal of "1" added to the head of a telephone number is supplied from the telephone set 3 connected to the modular terminal t3, the modular terminal t3 is connected to the interface S2 so that the telephone set 3 is switched into the side of the internet network B. When the number data signal of "2" added to the head of the telephone number is supplied, the modular terminal t3 is connected to the public switched phone terminal t4 so that the telephone set 3 is switched into the side of the public switched phone network C.

The switching circuit 5 is also adapted as follows. When a telephone signal is supplied from the output terminal t1 through the cable modem S1 and interface S2, the interface S2 is connected to the modular terminal t3. When the telephone signal is supplied from the public switched phone terminal t4, the public switched phone terminal t4 is connected to the modular terminal t3.

An explanation will be given of the method of making a call by means of the internet telephone system.

The terminal device 2 is connected to the CATV station 1 in such a manner that the connecting terminal t1 is connected to the distributing cable a retracted into a general home or SOHO.

In the terminal device 2, the tuner section T receives, via the distributor 4, the RF signal transmitted from the CATV station 1 through the transmitting cable a. The tuner section T subjects the RF signal to desired video signal processing and audio signal processing to create a TV channel signal which will be sent to a television receiver (not shown) from output terminal t2.

The terminal device 2 has the same function of receiving the TV program broadcast from the CATV station 1 as that of a conventional CATV terminal device.

The terminal device 2 is connected to the telephone set 3 through the modular line d and is connected to the public switched phone terminal t4 through the public switched phone network such as NTT.

When a user wants to originate a call from the telephone set 3 through the internet network, he adds the number of "1" to the head of a telephone number.

Therefore, the switching circuit 5 is switched into the side of connecting the modular terminal t3 to the interface S2. Thus, the calling signal inputted from the telephone set 3 is supplied to the interface S2.

The calling signal supplied to the interface S2 is converted into the modem signal which is supplied to the cable modem S1. In the cable modem, the modem signal is inserted in the vacant band of the RF signal transmitted from the CATV station 1 through the transmitting cable a.

The calling signal inserted in the vacant region of the CATV network is transmitted to the CATV station 1 through the transmitting cable a, and further transmitted to the internet network connected to the CATV station 1.

In this way, the telephone set 3 is communicated with the called party having an IP address corresponding to the calling signal through the internet network so that the call by the internet telephone can be executed.

When the user wants to originate a call from the telephone set 3 through the public switched phone network, he adds the number of "2" to the head of a telephone number.

Thus, the switching circuit 5 is switched into the side of connecting the modular terminal t3 to the public switched phone terminal t4 so that the telephone set 3 is communicated with the public switched phone network. This permits the speech to be executed through the public switched phone network C.

On the other hand, when a calling signal which calls up the telephone set 3 is supplied from the internet network B through the CATV station 1 (i.e. there is a call from the internet telephone), it is inputted to the interface section S through the distributor. It is demodulated by the cable modem S1 and converted into the telephone signal which is in turn supplied to the switching circuit 5.

When the switching circuit 5 receives the telephone signal from the interface unit S2, it is switched into the side of connecting the interface unit S2 to the modular terminal t3. Thus, the telephone signal is supplied to the telephone set 3.

In this way, the telephone set 3 is communicated with the internet network B so that the speech through internet telephone can be executed.

Further, when the telephone signal is supplied to the public switched phone terminal t4 through the public switched phone network C, the switching circuit 5 is switched into the side of connecting the public switched phone terminal t4 to the modular terminal t3. Thus, the telephone signal is supplied to the telephone set 3.

In this way, the telephone set 3 is communicated with the public switched phone network C so that the call through the public telephone can be executed.

As described above, in either of both cases where the telephone set 3 connected to the terminal device 2 is located on the side of calling party and called party, using the switching by the switching circuit 5, the call by both the internet telephone and public telephone can be executed by a single telephone set 3.

In the call by the internet telephone or public telephone executed as described above, when the telephone signal is supplied to the switching circuit 5 from the telephone set 3, interface S2, or public switched phone terminal t4, a part of the telephone signal is supplied from the switching circuit 5 to the micro-controller T10 of the tuner T.

When the micro-controller T10 receives the telephone signal from the switching circuit 5, it sends an amplification limiting signal e to the audio amplification circuit T6.

Thus, during the call by the internet telephone or public telephone, the amplification factor of the audio signal in the audio amplifying circuit T6 is limited to a prescribed value so that the sound volume from the TV receiver (not shown) is automatically lowered.

The amplification factor of the audio signal in the audio amplification circuit T6 is limited to the prescribed value so that the sound volume from the TV receiver does not impede the call by the telephone set 3.

In accordance with the internet telephone system as described hitherto, when the user wants to use the internet telephone, by using the terminal device of the CATV the power of which is usually always "on", he is not required to wait until the terminal device is booted.

The user has only to input the discriminating code through a single telephone set to select the internet telephone or public telephone. Further, he can receive both the internet telephone and public telephone by the single telephone set. Unlike before, it is not required to provide the internet terminal in addition to the public telephone.

Further, in accordance with the status of the telephone facilities on the side of the called party, he can use easily properly the public telephone or internet telephone which is cheap in the calling fee. Further, when the calling party calls through the internet telephone, even the called party has not yet booted the internet terminal device, the calling party immediately calls again through the public switched phone network using the same telephone set.

In the internet telephone system according to the invention, when the calling is sent from or to the telephone set 3, the sound volume of the TV receiver is automatically lowered to a prescribed level even while the TV receiver puts the broadcasting program transmitted from the CATV station 1. Therefore, the calling by the telephone set 3 will not be impeded by the sound of the TV receiver.

In the embodiment described above, although switching between the internet telephone and the public telephone was automatically done by the switching circuit 5, it may be manually done.

Furthermore, it may be automatically done according to the calling time and calling distance between the calling party and called party.

What is claimed is:

1. An internet telephone system comprising:

an internet network;

a CATV station connected to the internet network so as to broadcast a television program;

a public switched phone network; and a terminal device connected to the CATV station and the public switched phone network and including a tuner section for receiving a broadcasting signal for the television program transmitted from the CATV station, an interface section for making transmission/reception of a telephone signal for the internet network, and a switching circuit which is connected to the interface section, a telephone set and the public switched phone network, wherein the switching circuit selectively connects the telephone set to the interface section or the public switched phone network on the basis of a switching signal supplied from the telephone set, in addition to a telephone number.

2. An internet telephone system according to claim 1 wherein the terminal device comprises audio control means for controlling an amplification factor of an audio signal of the television program supplied from the tuner section when a telephone signal is supplied from the telephone set, interface section or public switched phone network to the switching circuit.

3. An internet telephone system according to claim 1, wherein the switching signal is outputted in accordance with a discrimination signal appended to a telephone number.

4. An internet telephone system according to claim 1, wherein said switching signal supplied from said telephone set is manually input into said telephone set by a user, whereby for each telephone number dialed the user determines whether said telephone set is connected to said interface section or to said public switched phone network.

5. A terminal device for an internet telephone system comprising:

a tuner section for receiving a broadcasting signal for the television program transmitted from the CATV station, the tuner section being connected to the CATV station;

an interface section for making transmission/reception of a telephone signal for the internet network; and a switching circuit connected to the interface section, a telephone and a public switched phone network, the switching circuit for selectively connecting the telephone set to the interface section or the public switched phone network, wherein the switching circuit selectively connects the telephone set to the interface section or the public switched phone network on the basis of a switching signal supplied from the telephone set, in addition to a telephone number.

6. A terminal device for an internet telephone system according to claim 5, further comprising:

audio control means for controlling an amplification factor of an audio signal of the television program supplied from the tuner section when a telephone signal is supplied from the telephone set, interface section or public switched phone network to the switching circuit.

7. A terminal device for an internet telephone system according to claim 5, wherein the switching signal is outputted in accordance with a discrimination signal appended to a telephone number.

8. A terminal device for an internet telephone system according to claim 5, wherein said switching signal supplied from said telephone set is manually input into said telephone set by a user, whereby for each telephone number dialed the user determines whether said telephone set is connected to said interface section or to said public switched phone network.

9. A communication process in an internet telephone system including an internet network, a CATV station connected to the internet network so as to broadcast a television program, a public switched phone network; and a terminal device connected to the CATV station and the public switched phone network and including a tuner section for receiving a broadcasting signal for the television program transmitted from the CATV station, an interface section for making transmission/reception of a telephone signal for the internet network and a switching circuit which is connected to the interface section, a telephone set and the public switched phone network, comprising the steps of:

inputting a discriminator as well as a telephone number; and selectively connecting the telephone set to the interface section or the public switched phone network through said switching circuit in accordance with said discriminator.

10. A communication process in an internet telephone system according to claim 9, wherein said discriminator is manually input by a user, whereby for each telephone number dialed the user determines whether said telephone set is connected to said interface section or to said public switched phone network.

11. A communication process in a terminal device for an internet telephone system including a tuner section for receiving a broadcasting signal for a television program transmitted from a CATV station, the tuner section being connected to the CATV station, an interface section for making transmission/reception of a telephone signal for an internet network, and a switching circuit connected to the interface section, a telephone and a public switched phone network, comprising the steps of:

inputting a discriminator as well as a telephone number; and selectively connecting the telephone set to the interface section or the public switched phone network through said switching circuit in accordance with said discriminator.

12. A communication process in a terminal device for an internet telephone system according to claim 11, wherein said discriminator is manually input by a user, whereby for each telephone number dialed the user determines whether said telephone set is connected to said interface section or to said public switched phone network.

* * * * *